Jan. 1, 1957 R. H. HARWOOD 2,775,828
SONAR SIMULATOR
Filed Aug. 20, 1953

INVENTOR.
ROBERT H. HARWOOD
BY George Sipkin
George E. Pearson
ATTORNEYS

United States Patent Office 2,775,828
Patented Jan. 1, 1957

2,775,828

SONAR SIMULATOR

Robert H. Harwood, San Diego County, Calif., assignor to the United States of America as represented by the Secretary of the Navy Application August 20, 1953, Serial No. 375,578

10 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates to simulators and more particularly to a sonar trainer.

It is an object of this invention to provide a sonar simulator utilizing recorded bearing and range information.

A further object is to provide a realistic simulator of audio signals such as are generated by sonar gear under actual operating conditions.

Still a further object is to provide a sonar simulator wherein the bearing of an object or objects is simulated in conjunction with a signal emanating or reflected therefrom.

Other objects and many of the attendant advantages of this invention will be readily appreciated as the same becomes better understood by reference to the following detailed description when considered in connection with the accompanying drawings wherein.

Figure 1:
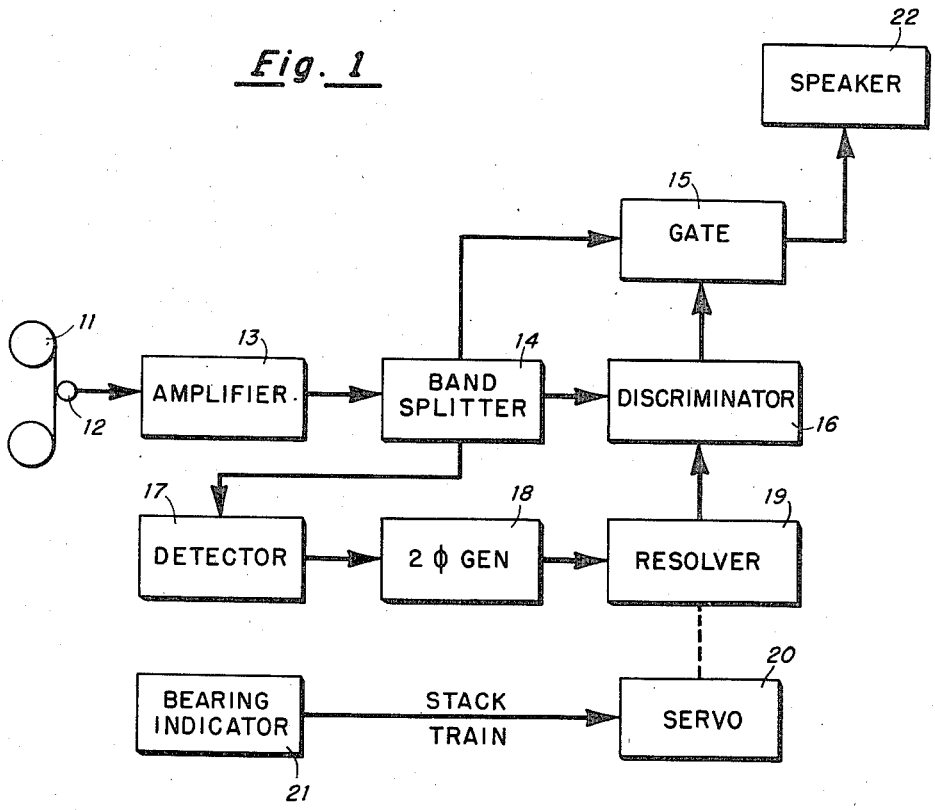
Fig. 1 is a block diagram illustrating the invention.
Figure 2:
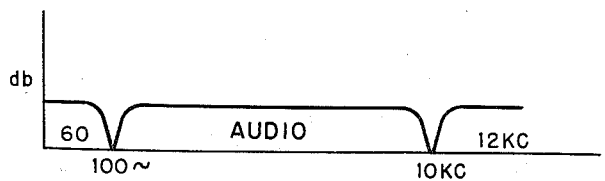
Fig. 2 is a graphical illustration of the various frequency bands utilized in the present embodiment of the invention.

Referring to the drawing, a recording medium such as magnetic tape 11 has a plurality of signals recorded thereon. Preferably these signals are recorded on the tape 11 by suitable recording mechanisms in conjunction with a sonar system under actual operating conditions. In the illustrated embodiment the tape has three signals each in different frequency bands recorded thereon, one being a 120 C. P. S. reference sine wave modulated onto a 12 kc. carrier, a second signal being a phase shifted sine wave at 60 C. P. S., and a third signal being in the audio band of 100 C. P. S. to 10 kc. All three of these signals are recorded simultaneously on the tape during the operation of the sonar gear and, since they are each in different frequency bands, may all be transcribed or reproduced with one transducer, such as indicated at 12 in the reproducing system.

In recording the 120 C. P. S. modulated reference signal is unvaried as it is fed into the tape recording transducer during operation of the sonar gear. The 60 C. P. S. sine wave however is phase shifted by suitable means such as a synchro transformer responsive to movement of the bearing mechanism or directional transducer of the sonar gear, and thus the phase shift of this 60 C. P. S. sine wave is a function of the bearing angle of the sonar transducer at any particular instant of recording. For example, if a three-phase voltage is impressed on the stator leads of a synchro, a single phase voltage will be induced on the rotor whose phase, in relation to a given reference, is directly proportional to the position of the rotor. The audio signal may be recorded directly from the audio output circuit of the sonar gear and thus is a true reproduction of the audio signal which would be heard by one operating the sonar gear. Alternatively, if desired, the reference wave together with arbitrarily varied audio and phase shifted (bearing information) waves might be recorded to simulate a particular desired set of circumstances.

The system illustrated in the figure utilizes this recorded information to simulate the actual conditions experienced by the sonar operator at the time the signals were recorded. The magnetic tape 11 having the signals recorded thereon is fed past a suitable transducer 12 which picks up the signals and feeds them to a broad band amplifier 13. The amplified signals are then fed into a suitable band splitter or filter circuit 14 which separates the three signals.

The audio signal is fed directly from the output of the band splitter 14 to the input of a gating circuit 15. The band splitter passes the 60 C. P. S. phase-shifted wave to a discriminator 16, while the 120 C. P. S. modulated reference wave is passed to the detector 17.

The detector 17 passes the 120 C. P. S. demodulated reference signal to a two-phase generator 18, the ouput of which is a pair of 60 C. P. S. waves 90 degrees phase apart. These waves are in turn fed into a two-phase resolver 19.

The rotor shaft of the resolver 19 is suitably connected as through a servo 20 for angular movement with a movable stack train which has a bearing indicator 21 connected thereto. Movement of the stack train (simulating the training of the sonar transducer) to angularly move the bearing indicator thus causes a corresponding angular movement of the rotor of the resolver 19. The phase of the 60 C. P. S. output of the resolver will thus be a function of the angular position of its rotor and correspondingly of the bearing indicator. The resolver 19, servo 20, and stack train are originally set so that when the rotor of the resolver 19 is turned by the stack train to the bearing on which the information was recorded, the phase of the 60 C. P. S. output thereof matches the phase of the recorded phase-shifted 60 C. P. S. signal.

The output of the resolver 19 is fed into the discriminator 16, and as stated supra the recorded 60 C. P. S. signal is also fed into the discriminator 16. When the phases of these two waves are in coincidence the output of the discriminator 16 will be zero. At other than in-phase relation the discriminator 16 has an output voltage proportional to such phase difference.

The output of the discriminator 16 is connected in bias relation to the gate circuit 15. It will thus be seen that when the bearing indicator and rotor of the resolver 19 are turned to the bearing on which the information was recorded, the phase of the resolver 19 output matches the phase of the recorded 60 C. P. S. wave, and the bias produced by the discriminator will be zero. The gate circuit 15 thus permits the audio signal to pass through to a suitable audio output such as speaker 22. When the bearing indicator and thus the rotor of resolver 19 are trained off the original bearing at which the recording was taken the output bias of the discriminator will bias the gate below the audio signal level, and no signal will be audible from the speaker 22.

Obviously many modifications and variations of the present invention are possible in the light of the above teachings. It is therefore to be understood that within the scope of the appended claims the invention may be practiced other than as specifically described.

What is claimed is:

1. A sonar trainer comprising a record medium having three simultaneous superimposed signals recorded thereon, means for reproducing and separating said signals, said means having three outputs, one for each of said signals, a phase discriminator, one of said outputs being connected to a first input into said discriminator, a second of said outputs being connected to a gate, the third of said outputs being connected to the input of a phase shiftable signal generating means, means for selectively causing said generating means to shift the phase of its output signal, the output of said generating means being connected to a second input into said discriminator, the output of said discriminator being connected in biasing relation to said gate.

2. A trainer comprising a record having three signals recorded simultaneously thereon, the first of said signals being a reference signal, the second signal differing in phase from said first signal by an amount representing a variable factor, means for reproducing said signals, means for comparing said first of said signals with said second of said signals, said comparing means having an output, gate means having the third said signal connected to its input, the output of said comparing means being connected in biasing relation to said gate.

3. A sonar trainer comprising a recording medium having three simultaneous wave forms recorded thereon, said wave forms being a reference wave, a second wave phase shifted proportional to bearing information, and a third wave representing object identification information, means for reproducing said wave forms, means for separating said wave forms one from the other, said separating means having three outputs one for each of said wave forms, gate means connected to said third wave form output, bearing training means having bearing indicating means associated therewith, resolving means having an input operably connected to the reference wave output of said separating means and proportional to said reference wave, said resolving means being operably connected to said bearing training means, the phase angle of the output of said resolving means being directly proportional to the bearing angle of said bearing training and indicating means, means for comparing the phase angle of the output of said resolving means with the phase angle of said second recorded wave, the output of said comparing means being proportional to the phase difference in said resolving means output and said second wave and being connected in biasing relation to said gate means, whereby said gate is open only when said difference in phase angles is substantially zero.

4. A sonar simulator system comprising a recording medium having a bearing signal, a reference signal and an audio signal, each in separate frequency bands, recorded in simultaneous relation thereon; means for reproducing said signals; means for separating said signals each from the other, said separating means having three outputs one for each of said signals, a gate, the audio signal output of said separating means being applied to the input of said gate, and means for comparing said bearing signal with said reference signal and for indicating said bearing information, said gate being biased to pass said audio signal when the bearing indication is in conformity with said recorded bearing information.

5. A sonar simulator as defined in claim 4 wherein said last named means comprises a two-phase generator having its input operably connected to the output of said separator, and having an output in proportion to the phase of said bearing signal, a two phase resolver connected to the output of said two-phase generator, a discriminator having a pair of inputs one of said inputs being connected to the reference signal output of said separator, and the other of said inputs being connected to the output of said two phase resolver, said discriminator having its output connected in bias relation to said gate.

6. A simulator as in claim 5 wherein there is provided a movable bearing indicator, said resolver having a rotor shaft, said rotor shaft being operably connected for one-to-one movement with said bearing indicator.

7. A sonar simulator as in claim 6 wherein the phase of the output of said resolver is proportional to the angular position of said rotor and to the bearing information signal input thereto.

8. A sonar simulator as defined in claim 5 wherein said bearing signal is a phase-shifted low frequency sine wave modulated onto a relatively higher frequency carrier, and wherein said reference signal is a sine wave having a frequency of one-half the frequency of said low frequency sine wave.

9. A sonar simulator as defined in claim 8 wherein said audio frequency signal is at all times lower in frequency than said bearing signal carrier.

10. A sonar training system comprising means having first, second, and third simultaneous signals, said second signal being a reference signal and said third signal being varied from said second signal by a phase angle proportional to a bearing angle, means for separating said signals one from the other and having first, second and third output means carrying said first, second, and third signals respectively, gate means connected to said first output means, discriminator means having its output connected in biasing relation to said gate means, said third output being connected to an input of said discriminator, means having its input connected to said second output and its output connected to an input of said discriminator, said last named means being operably connected to a bearing training means, and having a signal the phase of which varies in relation to the bearing angle of said bearing training means.

References Cited in the file of this patent

UNITED STATES PATENTS

| 2,545,191 | Brettell | Mar. 13, 1951 |
| 2,548,684 | Roth | Apr. 10, 1951 |